UNITED STATES PATENT OFFICE.

ENGELBERT ARNOLD, OF KARLSRUHE, GERMANY, AND JENS LASSEN LA COUR, OF EDINBURGH, SCOTLAND.

SINGLE-PHASE ALTERNATING-CURRENT MOTOR WITH COMMUTATING-POLES

No. 853,491.      Specification of Letters Patent.      Patented May 14, 1907.

Application filed October 9, 1905. Serial No. 282,014.

*To all whom it may concern:*

Be it known that we, ENGELBERT ARNOLD, of Karlsruhe, Germany, and JENS LASSEN LA COUR, of Edinburgh, Scotland, have invented certain new and useful Improvements in Single-Phase Alternating-Current Motors with Commutating-Poles, of which the following is a specification.

In direct current machines for high speeds and heavy over-loads, commutating poles are frequently employed to obtain a sparkless commutation. These poles are excited by the armature current to such a strength that the field beneath them is oppositely directed to the armature field and just suffices to induce the E. M. F. necessary for commutation in the short circuited coils. The same arrangement has been several times proposed for single phase motors, but since in single phase motors the pulsation of the main field induces large E. M. Fs in the short circuited coils, it is here necessary to excite the commutating poles in a different manner to that for direct current machines.

When commutating poles are used, means have to be provided for preventing the armature ampere turns from producing a strong cross field through the commutating poles, which not only is harmful to the commutation, but produces a great self-inductive reactance in the armature. Therefore compensating windings are provided, one part of which is distributed in the pole shoes of the main poles, while the other part is on the commutating poles; these compensating windings are connected in series to the armature so as to neutralize completely the armature field. On the other hand a commutating field has to be excited displaced about 90° in phase to the main field, since the E. M. F. induced by the main field in the short circuited coils lags about 90° behind it. Therefore the exciting windings of this commutating field are connected to a voltage in phase with the main field as will be shown in the following.

Figure 1:
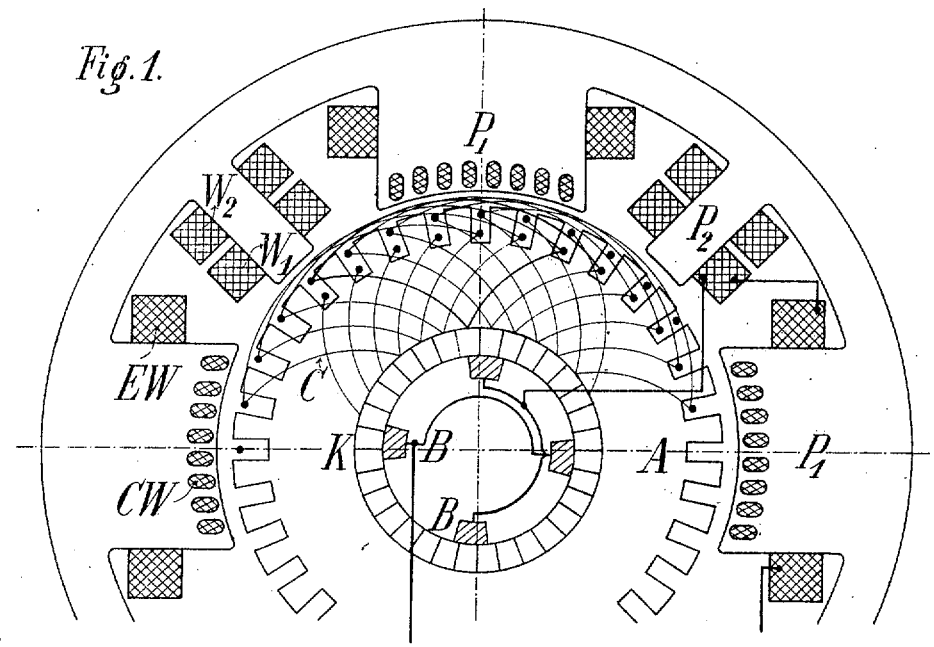
Figure 2:
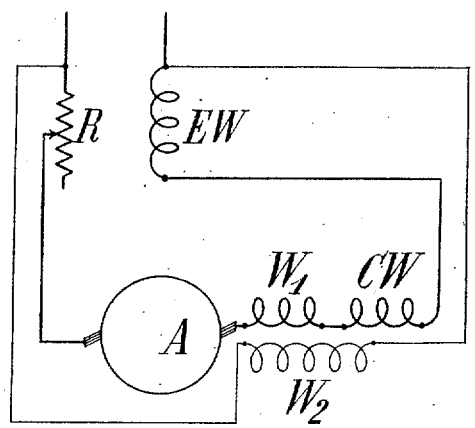
Figure 3:
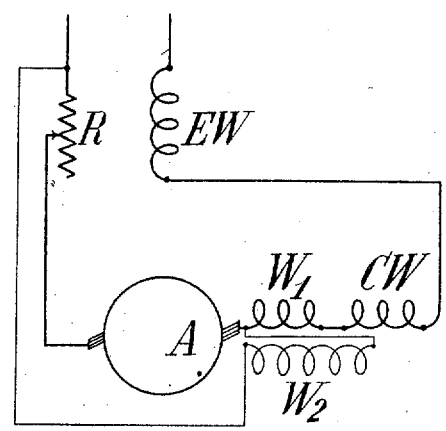

In the drawing forming a part of the specification—Figure 1 is a partial side view of a machine embodying the invention; and Figs. 2 and 3 are diagrams showing the various connections described.

Fig. 1 shows the arrangement for a four pole machine with the main poles $P_1$, and the commutating poles $P_2$. A is the armature and C a part of the armature windings. K is the commutator with four brushes B, corresponding to the number of poles, the brushes of like polarity being connected to each other as in any multipolar machine. CW is the compensating winding lying in slots in the pole shoes of the main poles, and $W_1$ the winding on the commutating poles, both carrying the armature current. The compensation winding of the main poles is provided with a number of ampere-turns equal to that of the portion of the armature winding lying beneath the main poles, for no cross field can then be formed under these. The winding $W_1$ on the commutating pole receives a somewhat greater number of ampere-turns than the portion of the armature winding lying between the poles; for then the field produced under the commutating poles by the armature winding, the compensating winding C. W. and the winding $W_1$ will facilitate the commutation of the armature current in the short circuited coils. There is besides the compensating winding on the main poles also the exciting winding E. W. necessary for the production of the main field and this winding is connected in series to the armature in a series motor and in parallel to the armature in a shunt motor. In order to compensate the E. M. Fs induced in the short circuited armature coils by the main poles, a second winding $W_2$ is arranged on the commutating poles. This winding is shunt excited and produces under the commutating poles a field, which is nearly 90° or in time a quarter period, displaced from the main field, since, when the motor is running its voltage is nearly in phase with the main field. If the short circuited armature coils rotate in the field of the winding $W_2$ E. M. Fs are induced in them which oppose the E. M. Fs induced by the pulsation of the main field. The commutating field should be as strong as possible. With regard however to the hysteresis losses produced in the teeth rotating in this field, too strong a commutating field is not desirable. But even if the commutating field is made only half as strong as the main field at synchronism, a very favorable action is obtained at higher speeds. At approximately 40% above synchronism the E. M. Fs induced in the short circuited coils will in this case vanish.

Fig. 2 shows diagrammatically the connections of the different windings for a series motor. The exciting winding E. W. of the main poles as well as the compensating windings C. W. and the winding $W_1$ of the commutating poles are connected in series to the armature A. R is the starting resistance. The winding $W_2$ of the commutating poles is connected to the mains. However, since one part of the total voltage corresponding to the E. M. F. of the exciting winding E. W. is in quatrature to the main field it is in many cases advisable to connect the shunt excited winding $W_2$ in parallel to the armature. In this case the E. M. Fs induced by the commutating field in the short circuited coils are proportional to the square of the speed; therefore it is preferable at starting to connect the winding $W_2$ in parallel with the armature and starting resistance as is shown in Fig. 3 for a series motor.

In the arrangement described the component parts are already known. The combination and correct proportions of these known elements is, however, new.

What is claimed is.

1. A single phase alternating current motor with a compensation winding lying in slots in the main poles and having the same ampere-turns as the portion of the armature winding under these poles and with commutating poles carrying two windings one of which in series and the other shunt excited, substantially as described.

2. A single phase alternating current motor with a compensation winding lying in slots in the main poles and having the same ampere-turns as the portion of the armature winding under these poles and with commutating poles carrying two windings one of which in series and the other shunt excited, the series excited windings of the commutating poles having somewhat more ampere-turns than the portion of the armature winding between the main poles.

3. A single phase alternating current motor with a compensating winding lying in slots in the main poles and having the same ampere-turns as the portion of the armature winding under these poles and with commutating poles carrying two windings one of which in series and the other shunt excited being connected to the mains.

4. A single phase alternating current motor with a starting resistance and with a compensating winding lying in slots in the main poles and having the same ampere-turns as the portion of the armature winding under these poles and with commutating poles carrying two windings one of which in series and the other shunt excited being connected in parallel to the armature and starting resistance.

In testimony whereof we have signed our names to this specification in the presence of two subscribing witnesses.

ENGELBERT ARNOLD.
JENS LASSEN LA COUR.

Witnesses for Engelbert Arnold:
H. W. HARRIS,
JOS. H. LEUTE.
Witnesses for Jens Lassen la Cour:
ROBERT F. SCOTT,
GEORGE BRAID.